(12) United States Patent
Chung

(10) Patent No.: US 9,397,760 B2
(45) Date of Patent: Jul. 19, 2016

(54) WIRELESS MICROPHONE BASED COMMUNICATIONS SYSTEM

(71) Applicant: JTS PROFESSIONAL CO., LTD., Taichung (TW)

(72) Inventor: Ming-Cheng Chung, Taichung (TW)

(73) Assignee: JTS PROFESSIONAL CO., LTD., Taichung (TW)

( * ) Notice: Subject to any disclaimer, the term of this patent is extended or adjusted under 35 U.S.C. 154(b) by 197 days.

(21) Appl. No.: 14/159,583

(22) Filed: Jan. 21, 2014

(65) Prior Publication Data

US 2015/0207560 A1 Jul. 23, 2015

(51) Int. Cl.
*H04B 7/00* (2006.01)
*H04B 11/00* (2006.01)
*H04B 7/24* (2006.01)

(52) U.S. Cl.
CPC . *H04B 11/00* (2013.01); *H04B 7/24* (2013.01)

(58) Field of Classification Search
CPC .............. H04B 7/24; H04B 7/00; H04M 1/00
USPC ........... 455/41.1, 41.2, 41.3, 556.2, 557, 66.1
See application file for complete search history.

(56) References Cited

U.S. PATENT DOCUMENTS

| | | | | |
|---|---|---|---|---|
| 7,558,529 B2* | 7/2009 | Seshadri | ............. | H04M 1/6033 455/41.2 |
| 2007/0298743 A1* | 12/2007 | Chung | ................. | H04B 5/0062 455/187.1 |
| 2008/0207265 A1* | 8/2008 | Chung | .................. | H04W 84/18 455/557 |
| 2009/0010458 A1* | 1/2009 | Chung | .................. | H04R 3/005 381/122 |
| 2009/0023388 A1* | 1/2009 | Chung | ..................... | H04R 1/00 455/41.2 |
| 2010/0303014 A1* | 12/2010 | McMullin | ............. | H04W 84/18 370/328 |
| 2011/0286600 A1* | 11/2011 | Gosior | .................... | A63F 13/12 381/2 |
| 2012/0001875 A1* | 1/2012 | Li | ......................... | G01S 7/5273 345/177 |
| 2012/0171963 A1* | 7/2012 | Tsfaty | .................... | H04B 11/00 455/41.3 |
| 2014/0192622 A1* | 7/2014 | Rowe | ........................ | G01S 5/18 367/117 |
| 2014/0340366 A1* | 11/2014 | Poulsen | .................. | G06F 3/043 345/177 |
| 2015/0119067 A1* | 4/2015 | Lavery | ................ | H04W 64/003 455/456.1 |
| 2015/0207560 A1* | 7/2015 | Chung | .................. | H04B 11/00 455/66.1 |

* cited by examiner

*Primary Examiner* — MD Talukder

(57) ABSTRACT

A communication system is provided with wireless microphones each including a first control panel, a first controller, a first codec, and a first ultrasound-based communications module, the first ultrasound-based communications module for emitting ultrasonic sound and receiving ultrasonic signals; and a wireless transceiver including a second control panel, a second controller on the second control panel for setting an operating frequency and an ID thereof and an operating frequency and an ID of each microphone, a second codec on the second control panel, and a second ultrasound-based communications module on the second control panel, the second ultrasound-based communications module. Data is sent from the transceiver to the microphone in an encrypted form and vice versa.

1 Claim, 2 Drawing Sheets

WIRELESS MICROPHONE BASED COMMUNICATIONS SYSTEM

BACKGROUND OF THE INVENTION

1. Field of the Invention

The invention relates to wireless communications system and more particularly to such a system comprising a wireless ultrasound-based transceiver and one or more ultrasound-based wireless microphones in which data can be transferred either between the transceiver and the microphone or between the transceiver and the microphone wirelessly.

2. Description of Related Art

Conventionally, electrical devices including microphones and stereos are connected to wall outlets in a room of a KTV center. One drawback is that wires may get tangled.

Still conventionally, as an improvement of the above arrangement, the microphones are replaced with wireless ones. Also, one or more controllers are provided in which each controller is adapted to control two wireless microphones. Thus, for example, three controllers are required to for controlling six wireless microphones. This inevitably will increase operating cost greatly.

U.S. Publication No. 20080207265 A1 discloses a communications system comprising a wireless microphones including a controller, a codec, a communications module, and an antenna; a wireless transceiver including a controller for setting an operating frequency and an ID thereof and an operating frequency and an ID of each microphone, a codec, a communications module, and an antenna; and a PC including a communications module and an antenna.

Notwithstanding the prior art, the invention is neither taught nor rendered obvious thereby.

SUMMARY OF THE INVENTION

It is therefore one object of the invention to provide a communications system comprising a plurality of wireless microphones each including a first control panel, a first controller disposed on the first control panel, a first codec (coder-decoder) disposed on the first control panel, and a first ultrasound-based communications module disposed on the first control panel, the first ultrasound-based communications module being capable of emitting ultrasonic sound and receiving ultrasonic signals; and a wireless transceiver including a second control panel, a second controller disposed on the second control panel for setting an operating frequency and an ID (identification) thereof and an operating frequency and an ID of each of the microphones, a second codec disposed on the second control panel, and a second ultrasound-based communications module disposed on the second control panel, the second ultrasound-based communications module being capable of emitting ultrasonic sound and receiving ultrasonic signals; wherein in a first communications operation performed between the transceiver and one of the microphones, in the transceiver data is encoded with an ID by the second codec, the encoded data is sent from the second codec to the second communications module, the second communications module emits ultrasonic sound containing the encoded data to the first communications module of each of the microphones, the first communications module of each of the microphones receives and send the encoded data to the first codec to be decoded, the decoded data is sent to the first controller of each of the microphones to determine whether the ID of the decoded data is valid or not by comparing the ID of the decoded data with an ID of one of the microphones; and wherein in a second communications operation performed between the transceiver and one of the microphones, in one of the microphones data is encoded with an ID by the first codec, the encoded data is sent from the first codec to the first communications module, the first communications module emits ultrasonic sound containing the encoded data to the second communications module of the transceiver, the second communications module of the transceiver receives and send the encoded data to the second codec to be decoded, the decoded data is sent to the second controller of the transceiver to determine whether the ID of the decoded data is valid or not by comparing the ID of the decoded data with an ID of the transceiver.

The above and other objects, features and advantages of the invention will become apparent from the following detailed description taken with the accompanying drawings.

DETAILED DESCRIPTION OF THE INVENTION

Figure 1:
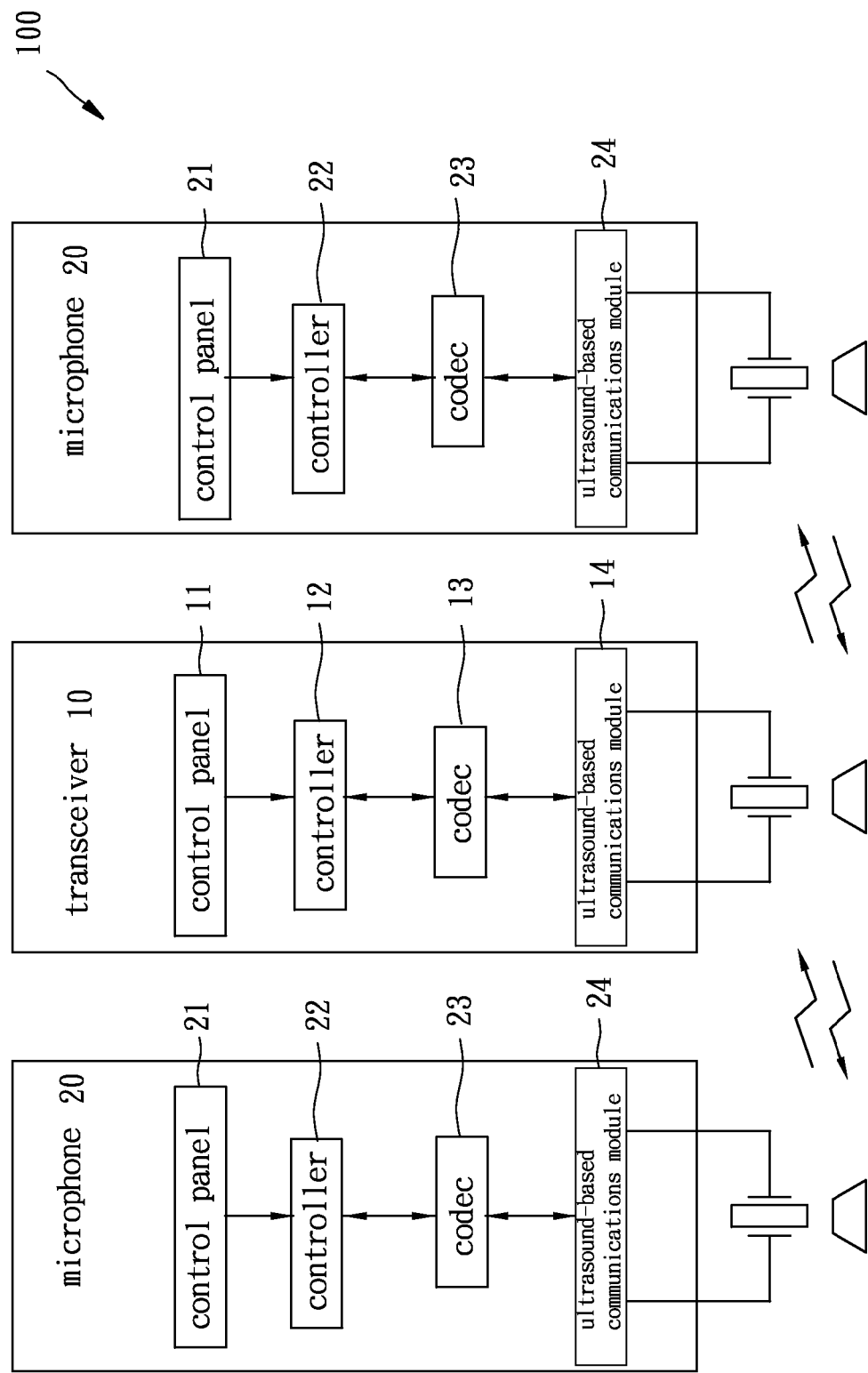
FIG. 1 is a block diagram of a preferred embodiment of communications system according to the invention.
Figure 2:
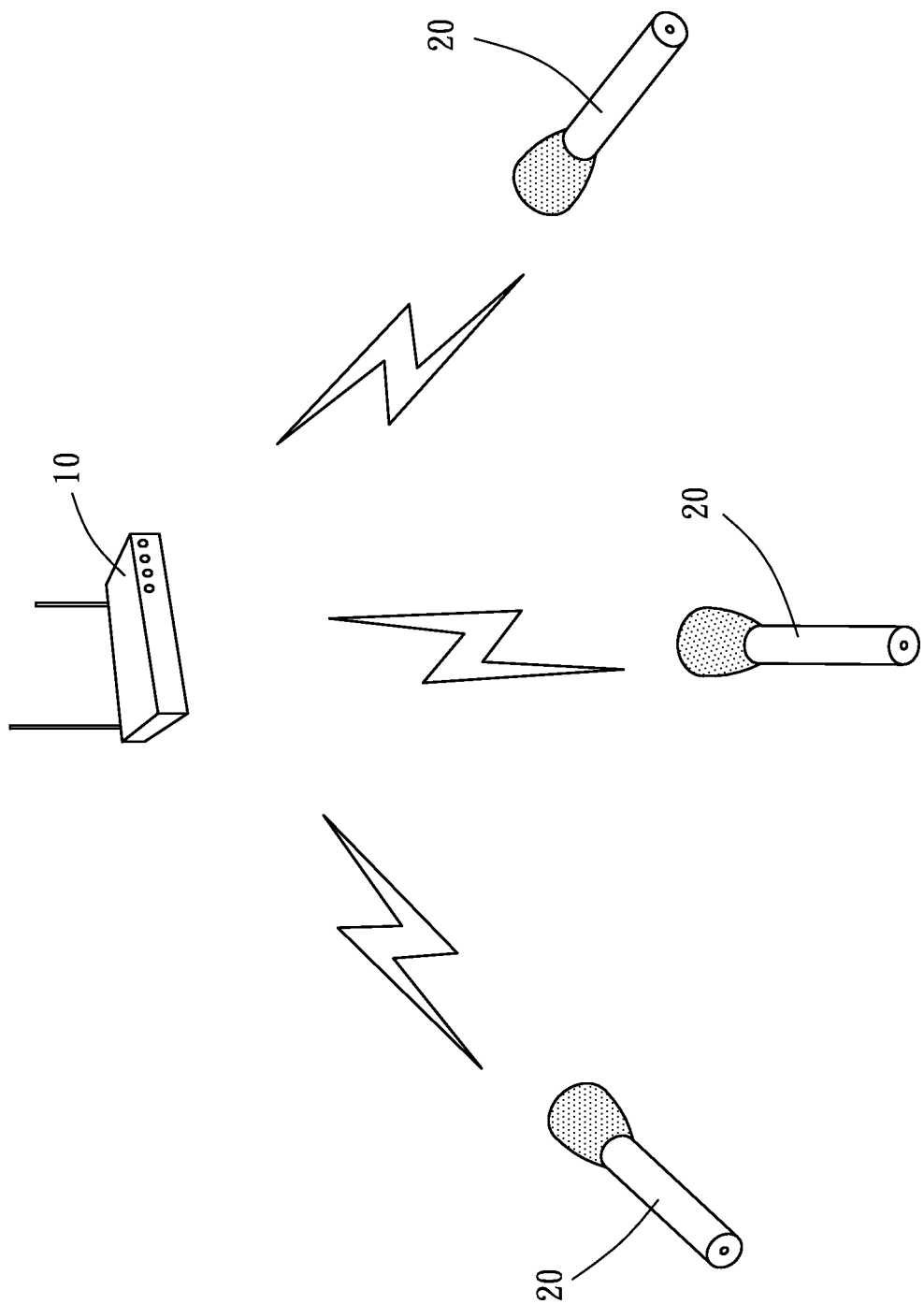
FIG. 2 schematically depicts wireless connections of the components of FIG. 1.

Referring to FIGS. 1 and 2, a communications system 100 in accordance with a preferred embodiment of the invention is illustrated. The system 100 comprises a wireless transceiver 10 and a plurality of wireless microphones (two are shown for description purpose) 20. Each component is discussed in detailed below.

The microphone 20 comprises a control panel 21, a controller 22 on the control panel 21 for setting a channel, transmission power, and a transmission range, a codec (coder-decoder) 23 on the control panel 21, a ultrasound-based communications module 24 on the control panel 21 and being capable of emitting ultrasonic sound and receiving ultrasonic signals, and an antenna (not shown).

The transceiver 10 comprises a control panel 11, a controller 12 on the control panel 11 for setting an operating frequency, an ID (identification), a channel, transmission power, and a transmission range and an operating frequency and an ID of each microphone 20, a codec 13 on the control panel 11; a ultrasound-based communications module 14 on the control panel 11 and being capable of emitting ultrasonic sound and receiving ultrasonic signals, and an antenna (not shown).

For example, in an exemplary operation of sending data from the transceiver 10 to one of the microphones 20, data is first encoded with an ID by the codec 13 in which the ID is set by the controller 12. Next, the encoded data is sent to the communications module 14. Next, the communications module 14 sends the data to the antenna of the transceiver 10 which in turn emits ultrasonic sound containing the data to the antenna of each of the microphones 20 for receiving. The received data is sent to the communications module 24 by the antenna of the microphone 20. The communications module 24 in turn sends same to the codec 23 for decoding. Next, the decoded data is sent to the controller 22 for processing. In detail, the controller 22 determines whether ID of the received data to be valid or not by comparing the ID of the received data with an ID of the controller 22 in which the ID of the controller 22 is also set by the transceiver 10. The controller 22 then processes the received data accordingly if the comparison result is true.

In another exemplary operation of sending data from one of the microphones 20 to the transceiver 10, steps the same as above are performed.

It is noted that a single transceiver 10 can control a plurality of microphones 20. Thus, operating cost is great reduced. Moreover, heat generated by the wireless transceiver 10 can be effectively dissipated.

A user can operate the controller 12 of the transceiver 10 to remotely locate and eliminate the source of trouble occurred in any microphone 20. Further, the controller 12 of the transceiver 10 can reset the operating frequencies of the microphones 20 for maintaining quality of the microphones 20.

Additionally, a two-way communication between the microphone 20 and the transceiver 10 or between the transceiver 10 and the microphone 20 is possible.

Although the invention has been described in detail, it is to be understood that this is done by way of illustration only and is not to be taken by way of limitation. The scope of the invention is to be limited only by the appended claims.

What is claimed is:

1. A communications system comprising: a plurality of wireless microphones each including a first control panel, a first controller disposed on the first control panel, a first codec (coder-decoder) disposed on the first control panel, and a first ultrasound-based communications module disposed on the first control panel and configured to emit ultrasonic sound and receive ultrasonic signals; and a wireless transceiver including a second control panel, a second controller disposed on the second control panel for setting an operating frequency and an ID (identification) thereof and an operating frequency and an ID of each of the microphones, a second codec disposed on the second control panel, and a second ultrasound-based communications module disposed on the second control panel, and configured to emit ultrasonic sound and receive ultrasonic signals;

wherein in a first communications operation performed between the transceiver and one of the microphones, in the transceiver data is encoded with an ID by the second codec, the encoded data is sent from the second codec to the second communications module, the second communications module emits ultrasonic sound containing the encoded data to the first communications module of each of the microphones, the first communications module of each of the microphones receives and send the encoded data to the first codec to be decoded, the decoded data is sent to the first controller of each of the microphones to determine whether the ID of the decoded data is valid or not by comparing the ID of the decoded data with an ID of one of the microphones; and wherein in a second communications operation performed between the transceiver and one of the microphones, in one of the microphones data is encode with an ID by the first codec, the encoded data is sent from the first codec to the first communications module, the first communications module emits ultrasonic sound containing the encoded data to the second communications module of the transceiver, the second communications module of the transceiver receives and send the encoded data to the second codec to be decoded, the decoded data is sent to the second controller of the transceiver to determine whether the ID of the decoded data is valid or not by comparing the ID of the decoded data with an ID of the transceiver; and wherein the first controller and the second controller process the received data when the decoded data is valid; and the controller of the transceiver controls the operating frequency of the microphones.

\* \* \* \* \*